United States Patent [19]

Mueller

[11] Patent Number: 5,010,155

[45] Date of Patent: Apr. 23, 1991

[54] VINYL-URETHANE SUBSTITUTED HYDROXYETHYL CELLULOSE

[75] Inventor: Karl F. Mueller, New York, N.Y.

[73] Assignee: Ciba-Geigy Corporation, Ardsley, N.Y.

[21] Appl. No.: 491,146

[22] Filed: Mar. 9, 1990

Related U.S. Application Data

[63] Continuation-in-part of Ser. No. 250,199, Sep. 28, 1988, abandoned.

[51] Int. Cl.⁵ ........................... B05D 3/02; B05D 3/12; B32B 27/00; B32B 27/40
[52] U.S. Cl. ........................................ 527/301
[58] Field of Search .......................... 527/301

[56] References Cited

U.S. PATENT DOCUMENTS 4,861,629 8/1989 Nahm .................... 527/301

*Primary Examiner*—Nathan M. Nutter
*Attorney, Agent, or Firm*—Luther A. R. Hall

[57] ABSTRACT

Vinyl substituted hydroxyethyl cellulose is obtained by reaction of hydroxyethyl cellulose, either in solution or in dispersion, with a vinyl-unsaturated isocyanate. The vinyl-urethane substituted hydroxyethyl cellulose of this invention can be used to form coatings on a substrate, such as glass, plastic, metal, wood and the like, which can subsequently be crosslinked by conventional UV-curing technology into hydrophilic films. When coated onto a mold, such coatings are especially useful in forming very hydrophilic surfaces on reaction-molded polymer shapes, such as contact lenses.

5 Claims, No Drawings

VINYL-URETHANE SUBSTITUTED HYDROXYETHYL CELLULOSE

This is a continuation-in-part of application Ser. No. 250,199, filed on Sept. 28, 1988, now abandoned.

BACKGROUND OF THE INVENTION

In many instances of polymer technology and polymer applications, it is desirable to impart to a polymer article surface properties which are different from the properties of the bulk. Good examples include the treatment of textiles to make them either more hydrophilic or more hydrophobic by coating with thin films of either hydrophilic or hydrophobic polymers, including fluorinated oleophobic polymers and curing and crosslinking them on the fiber to achieve some permanence. While this will produce a homogeneous continuous film of definite thickness, permanence is usually poor because little or no covalent bonding exists between the polymer and the fiber, and by abrasion during repeated washing, dry cleaning and drying cycles the polymer film is easily removed.

Another method for modifying polymer-surfaces is grafting. Grafting is the covalent attachment of monomers or polymers on existing polymer chains, for instance solid polymer surfaces. This can be accomplished in numerous ways. For example, treatment with ionizing radiation (x-rays, electron beams) in the presence of oxygen of a polymer surface, followed by heat-treatment of the peroxidized polymer in presence of an appropriate vinyl monomer will give graft-modified surfaces. Another method to introduce peroxy groups onto a polymer surface is by ozone treatment. Treatment with a plasma (ionized gas) alone can oxidize and otherwise chemically modify a polymer surface, dependent on the nature of the plasma, and this method can be used to hydrophilize polyolefins in order for them to absorb printing ink.

Grafting onto solid polymers can also be carried out by first immersing the polymer in a monomer with an initiator for a specified time, followed by exposing the surface-swollen polymer to polymerizing conditions. Many variation of the mentioned processes have been described, all having as the objective the grafting of a vinyl polymer on a preformed polymer substrate.

There are several major drawbacks to all these processes and products; for instance polymerization can occur not only on the surface, but also in the liquid polymerization medium. Also, because the polymerization depends on active centers which decompose at different times, inhomogeneous surfaces result because of preferential absorption of monomer into already modified surface regions. In cases where exact depth-control and uniformity of the grafted region is important, such as for example in the surface modification of contact lenses, such uncontrollable grafting reactions are not acceptable. On the other hand, if, to reduce inhomogeneities, grafting is carried out for a short time only, the grafted surface regions are too thin and in many applications the surface effect soon wears off.

Although free-radical grafting of vinyl-monomers is by far the most commonly used method for grafting onto polymer surfaces, if these polymers contain suitable reactive groups, other reactions can be utilized; polyvinyl alcohol or cellulose can for instance be grafted with isocyanato compounds, polydienes with mercaptans, and oxirane groups containing polymers with amines and mercaptans. In most practical cases however the polymer one wishes to modify is an inert, non-reactive polymer.

Yet another method of surface-modification, this one by formation of an interpenetrating polymer network (IPN) in which a second polymer interpenetrates a first one without covalent bonding between both, has been described in the literature, for example in U.S. Pat. No. 4,423,099. These methods too have the disadvantage of having swelling steps involved which in applications like contact lenses lead to unacceptable surface distortions.

In the contact lens field, surface properties are important because they affect deposit-formation and wettability and thereby the comfort of the lens for the wearer. Lack of wettability is an especially serious problem in contact lenses made from silicone rubber, which because of its very high, oxygen permeability would otherwise be an ideal contact lens material. Many of the mentioned processes of surface-grafting and irradiation have been used to overcome this wettability problem and either suffer from a lack of permanence or from poor optical quality, as is indicated by the fact that a generally accepted silicone rubber soft contact lens has not yet been produced. Relevant patents in this area include: U.S. Pat. No. 3,925,178, which describes surface treatment by water-vapor subjected to an electrical discharge; U.S. Pat. No. 4,099,859 describes grafting a hydrophilic polymer onto a silicone-rubber contact lens by coating the lens with a hydrophilic monomer followed by exposure to UV; U.S. Pat. No. 4,229,273 describes grafting of an acrylic polymer onto a silicone rubber lens pre-irradiated in the presence of oxygen; U.S. Pat. No. 4,168,112 describes the formation of a poly-electrolyte complex on the surface of a contact lens in order to render it more hydrophilic and comfortable to wear; U.S. Pat. No. 4,217,038 describes the formation of a glass-coating on a silicone contact lens to improve wettability; U.S. Pat. No. 4,409,258 describes a hydrophilizing treatment of contact lenses by bombardment with nitrogen and oxygen containing gas-ions; U.S. Pat. No. 4,388,164 describes coating the surface of a silicone rubber with a thin metal film by vacuum decomposition in the stretched state; U.S. Pat. No. 4,332,922 describes hydrophilization of silicone contact lenses by a gas-discharge; U.S. Pat. No. 4,143,949 describes a hydrophilic coating onto a hydrophobic contact lens by radiation induced polymerization; U.S. Pat. No. 4,311,573 describes hydrophilization of a hydrophobic polymer by ozone treatment, followed by a grafting of vinyl monomers through decomposition of the formed peroxy groups; U.S. Pat. No. 4,652,672 describes surface hydrophilization of polysiloxane contact lens materials by inclusion of N-alkenoyl trialkylsilylaminate, 1–12 parts by weight, into the monomer mixture and hydrolysis after polymerization.

Although many of these reactants are successful in increasing the wettability of a hydrophobic polymer, the effect is generally limited to a thin surface region and therefore is not permanent.

It would be desirable to have an integral, hydrophilic surface layer completely covering the underlaying hydrophobic polymer in such a way, that no hydrophobic groups can penetrate to the surface. It is, however, difficult to produce such hydrophilic/hydrophobic laminates with good adhesion, especially if on immersion in water one of the polymers swells a much higher degree than the other.

In copending patent application Ser. No. 250,199 a process is described, in which a mold is coated with a hydrophilic polymer, bearing groups which are capable of copolymerizing with the reactive groups of the polymerizing mixture to be molded, and which hydrophilic polymer is transferred by grafting during the polymerization onto the surface of the molded part, forming an integral and continuous skin. Because the reactive polymer coating is a hydrophilic polymer that skin on the surface of the molded part will be completely hydrophilic and in no way resemble the underlying polymer. Because of the covalent bonding between both polymers and because of the defined thickness of the grafted polymer film, the surface is very abrasion resistant and durable, while at the same time precisely replicating the mold surface. It has further been discovered, that methacrylate functional hydroxyethyl cellulose is especially well suited to act as the hydrophilic polymer used for coating the mold, and hydroxyethyl cellulose bearing urethane-connected acrylate- or methacrylate groups is the object of this invention.

In contrast to conventionally grafted surfaces, where the grafted surface polymer chains are essentially dangling chains, attached to the substrate at one end, the grafted polymer chains of this invention are multiply attached to the substrate at sites distributed along their whole length.

Furthermore, and also in contrast to conventionally grafted surfaces where the grafted surface layer is formed in an open medium—air, nitrogen, solvents——and therefore does not exactly conform to a desired surface shape or surface quality, the grafted hydrophilic hydoxyethyl cellulose coating of this invention is preshaped, conforming to a given substrate, and therefore the final product composite precisely replicates that substrates configuration and surface quality.

Specifically, this invention describes hydroxyethyl cellulose, whose hydroxy groups have been partially reacted with a vinyl-unsaturated isocyanate, preferably an isocyanatoalkyl acrylate or methacrylate.

U.S. Pat. No. 4,565,857 discloses the reaction product of cellulose-acetate-butyrate (CAB), containing 4.3% residual hydroxy groups, with 2-isocyanato-ethyl methacrylate (IEM) as UV-curable protective coating; U.S. Pat. No. 3,782,950 describes the reaction product of hydroxypropyl cellulose with IEM, also for use as a protective coating. U.S. Pat. No. 4,605,622 describes photocurable polysaccharides of 300–100000 MW, bearing at least two unsaturated groups per molecule, obtained by reaction with glycidyl (meth)acrylate, itaconic anhydride or maleic anhydride.

DETAILED DESCRIPTION

The instant invention pertains to vinyl functional hydroxyethyl cellulose, HEC-V, which comprises hydroxyethyl cellulose, HEC, of at least 10000 MW, in which 0.5–5% of the hydroxy groups have been reacted with a vinyl functional isocyanate, V.

Hydroxyethyl cellulose is prepared commercially by reaction of cellulose with ethylene oxide in an alkaline medium. The resulting ethoxylated cellulose, HEC, is characterized by the degree of substitution, D.S., which denotes the average number of hydroxy groups on one ring of the cellulose unit, which have reacted with ethylene oxide; molar substitution, M.S., denotes the average number of ethylene oxide molecules, which have reacted with one ring of a glucose unit. D.S. values can range from less than 1 to maximal 3; M.S. values can have any value greater than zero, but are usually below 10.

Various grades of hydroxyethyl cellulose are commercially available, for instance under the trade name CELLOSIZE from Union Carbide.

The vinyl functional isocyanate is styrene isocyanate, m-isopropenyl-1,1-dimethylbenzyl isocyanate, an isocyanatoalkyl vinyl ether, or an isocyanato-alkyl acrylate or methacrylate of structure $$CH_2=CR_1-COOR_2NCO \qquad (I)$$

wherein $R_1$ is hydrogen or methyl and $R_2$ is a linear or branched alkylene group with 2–10 carbon atoms.

The compounds of formula I can be prepared by reaction of acryloyl or methacryloyl chloride with amines, followed by phosgenation, as described in U.S. Pat. No. 2,821,544.

Typical compounds include: 2-isocyanatoethyl acrylate or methacrylate, 3-isocyanatopropyl acrylate or methacrylate, 4-isocyanatobutyl acrylate or methacrylate, 6-isocyanatohexyl acrylate or methacrylate, 1-methyl-2-isocyanatoethyl methacrylate and 1,1-dimethyl-2-isocyanatoethyl methacrylate.

Preferably, in the vinyl functional hydroxyethyl cellulose HEC-V of this invention, HEC is hydroxyethyl cellulose of $15000-3\times10^6$ MW with a D.S. of 0.5–3 and a M.S. of 1–10, and the vinyl functional isocyanate V is an isocyanatoalkyl acrylate or methacrylate.

Preferably, HEC in HEC-V is of $20000-2\times10^6$ MW and has a D.S. of 0.8–2.0 and a M.S. of 1.5–4, and the vinyl functional isocyanate V is 2-isocyanatoethyl methacrylate.

The synthesis of the vinyl functional HEC from HEC and vinyl isocyanates is carried out in solution or dispersion, using a catalyst and aprotic solvents or non-solvents as medium. Suitable solvents include N,N-dimethylformamide, formamide, phosphoric acid tri-dimethylamide, N-methyl-2-pyrrolidone, N,N-dimethylacetamide, acetamide, acetonitrile and, preferably, dimethyl sulfoxide. When the reaction is carried out in dispersion, suitable aprotic non-solvents include acetone, methyl ethyl ketone, methyl propyl ketone, ethyl acetate and ethylene glycol dimethyl ether.

Suitable catalyst are amines and organo-metallic compounds commonly used for catalyzing urethane reactions, for example trimethylamine, triethylamine, N,N-dimethylbenzylamine, and stannous octoate, dibutyltin dilaurate and sodium acetate.

The following examples demonstrate the usefulness of this invention.

In the examples, contact angles are determined on samples stored for three days in phosphate-buffered saline (PBS) solution; receding contact angles are obtained on air bubbles floated to the underside of a sample immersed in distilled water., advancing contact angles are determined on water drops deposited on the surface of samples superficially dried in a nitrogen stream.

Wettability is also determined qualitatively by observing the retraction behavior of a water droplet smeared across the surface with a glass rod; on a scale of 1–5, 1 denotes very fast retraction and discontinuous water film formation; 5 denotes no retraction at all and complete wettability. At the same time blocking or non-blocking (slipperiness) of the surface is noted.

EXAMPLE 1

1.12 g Hydroxyethyl cellulose (HEC; CELLOSIZE QP-100 M; MW: 1,000,000); is added to a stirred solution of 0.43 g 2-isocyanatoethyl methacrylate (IEM) and 1.00 g of 10% triethylamine/90% 2-butanone. The reaction exhibits a mild exotherm and 1.903 g 2-butanone is added to facilitate stirring the thick slurry. After stirring the slurry for 8 hours, IR analysis of the solution shows no -NCO remaining in the sample. A slightly hazy 2% aqueous solution is obtained by heating the sample at 50° C. for 2 hours and then stirring overnight. The polymer contains approximately 1 double bond per glucose unit of HEC.

EXAMPLE 2

Using the same procedure, hydroxyethyl cellulose of MW 214,000 is also functionalized with 1 mol IEM per glucose unit in HEC.

EXAMPLE 3

95 g Dimethyl sulfoxide are vigorously stirred in a 300 ml three-neck round bottom flask equipped with nitrogen inlet, reflux condenser, mechanical stirrer and heating mantle. 5 g hydroxyethyl cellulose (CELLOSIZE, 120000 MW; Union Carbide) are slowly added, dispersed and dissolved while heating to 60° C. The mixture is cooled to room temperature and 2.09 g ( 22.4 equivalent % of OH) 2-isocyanatoethyl methacrylate are added to the vigorously stirred solution, followed by 0.005 g sodium acetate. The flask is kept at room temperature for four hours, after which time the reaction is completed, as evidenced by the disappearance of the NCO absorption band at 2270 cm$^{-1}$. The clear, viscous solution is stored at room temperature under dry nitrogen.

The following examples show the use of the methacrylate functional HEC as surface coating on a molded hydrophobic polymer.

EXAMPLES 4-5

MYLAR sheets are coated with 0.5% aqueous solutions of methacrylate-functional HEC of Examples 1 and 2, using a 0.003 inch knife-coater. The coated sheets are allowed to dry for 10 hours in air and used as mold liners for a flat mold, consisting of 5×5 inch glass plates, separated by a 0.5 mm silicone cord and held together by clamps. Into this mold is poured a thoroughly degassed monomer mixture consisting of: a polysiloxane-dimethacrylate obtained by reaction of 2 moles bis-(hydroxypropyl)-polysiloxane with, first, 3 moles isophorone diisocyanate, secondly, 2.05 moles 2-hydroxyethyl methacrylate, 70%; 20% 2-ethylhexyl acrylate, 5% N.N-dimethylacrylamide and 5% methyl methacrylate and containing 0.2 % benzoin methyl ether as UV initiator.

The monomer filled molds are exposed for 4 hours to the UV radiation from a SYLVANIA-BLACKLITE BLUE lamp at a 2 inch distance. In the same manner a polymer sheet with the same composition is prepared, but using uncoated MYLAR as a mold liner.

After polymerization the polymer sheets are removed, soaked in 90% aqueous ethanol for 12 hours to remove extractables, dried and then tested as described. The results show that excellent grafting is obtained with the methacrylate-functional HEC.

| Example | Polymer of Ex. | MW of HEC | Wettability by Retraction Test | Blocking Test | Contact Angle (°) Adv. | Rec. |
|---|---|---|---|---|---|---|
| 4 | 1 | 1 × 10$^6$ | 5 | No | 25 | 36 |
| 5 | 2 | 214 × 10$^3$ | 5 | No | 23 | 45 |
| Control Polymer cast between uncoated MYLAR sheets | | | 1 | Yes | 95 | 45 |

What is claimed is:

1. Vinyl functional hydroxyethyl cellulose, HEC-V, which comprises hydroxyethyl cellulose, HEC, of at least 10000 MW, in which 0.5-5% of the hydroxy groups have been reacted with a vinyl functional isocyanate, V.

2. A compound according to claim 1, wherein the vinyl functional isocyanate V is styrene isocyanate, m-isopropenyl-1.1-dimethylbenzyl isocyanate, an isocyanatoalkyl vinyl ether, or an isocyanatoalkyl acrylate or methacrylate of structure $$CH_2=CR_1—COOR_2NCO \quad (I)$$

wherein $R_1$ is hydrogen or methyl and $R_2$ is a linear or branched alkylene group with 2-10 carbon atoms.

3. A compound according to claim 2, wherein the vinyl functional isocyanate V is 2-isocyanatoethyl acrylate or methacrylate, 3-isocyanatopropyl acrylate or methacrylate, 4-isocyanatobutyl acrylate or methacrylate, 6-isocyanatohexyl acrylate or methacrylate, 1-methyl-2-isocyanatoethyl methacrylate or 1,1-dimethyl-2-isocyanatoethyl methacrylate.

4. A compound according to claim 1, where in the vinyl functional hydroxyethyl cellulose HEC-V, HEC is hydroxyethyl cellulose of 15000-3×10$^6$ MW with a degree of substitution, D.S. of 0.5-3 and a molar degree of substitution, M.S. of 1-10, and the vinyl functional isocyanate V is an isocyanatoalkyl acrylate or methacrylate.

5. A compound according to claim 4, where in the vinyl functional hydroxyethyl cellulose HEC-V, HEC is of 20000-2×10$^6$ MW and has a D.S. of 0.8-2 and a M.S. of 1.5-4, and the vinyl functional isocyanate V is 2-isocyanatoethyl methacrylate.

* * * * *